United States Patent
Makeever

(10) Patent No.: US 7,377,426 B1
(45) Date of Patent: May 27, 2008

(54) INTERACTIVE VISITOR ANNOUNCEMENT/ACCESS CONTROL SYSTEM

(76) Inventor: Todd Makeever, 6510 Birkshire Pl., University Park, FL (US) 34201

( * ) Notice: Subject to any disclaimer, the term of this patent is extended or adjusted under 35 U.S.C. 154(b) by 308 days.

(21) Appl. No.: 11/217,620

(22) Filed: Sep. 1, 2005

(51) Int. Cl.
    *G06K 5/00* (2006.01)
(52) U.S. Cl. .......................................... 235/382; 705/5
(58) Field of Classification Search .......... 235/380, 235/382; 705/5
    See application file for complete search history.

(56) References Cited

U.S. PATENT DOCUMENTS

| | | | |
|---|---|---|---|
| 5,995,139 A | 11/1999 | Lee | |
| 6,394,356 B1 * | 5/2002 | Zagami | 235/487 |
| 6,504,470 B2 | 1/2003 | Puchek et al. | |
| 6,513,119 B1 | 1/2003 | Wenzel | |
| 6,749,112 B2 | 6/2004 | Terada et al. | |
| 6,794,986 B2 | 9/2004 | Puchek et al. | |
| 7,222,241 B2 * | 5/2007 | Milgramm et al. | 713/186 |
| 2003/0112939 A1 | 6/2003 | Horn | |
| 2004/0233036 A1 | 11/2004 | Sefton | |
| 2005/0114192 A1 * | 5/2005 | Tor et al. | 705/8 |

* cited by examiner

*Primary Examiner*—Jamara A Franklin
(74) *Attorney, Agent, or Firm*—Charles J. Prescott

(57) ABSTRACT

An interactive visitor announcement/access control system for residents of limited access and gated communities. The system includes a computer database and a community staff-operated personal computer (p.c.) located at each visitor access point to the community, the staff p.c. being connected to the database by direct link and/or via the Internet. Each resident having a personal computer is provided with limited Internet access to the database to enter scheduling information and a description of each expected visitor, including the visit date and time, the name of each visitor, and a printed bar-coded pass authorization and mode of delivery thereof for each visitor.

7 Claims, 3 Drawing Sheets

INTERACTIVE VISITOR ANNOUNCEMENT/ACCESS CONTROL SYSTEM

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to systems and methods for dealing with visitors of each resident of one or more gated or restricted access communities and more particularly to an interactive visitor access control system and method for more reliably and fluently dealing with a broad range of visitors to such communities.

2. Description of Related Art

Many residential communities and businesses allow visitors and guests to freely come and go through the interior property by simply entering through one or more of the open entrances to such communities and businesses. However, other such communities and businesses have chosen to restrict visitor access and have provided a staff and one or more points of entry into the property which regulate visitor traffic flow to insure that only authorized visitors to specific residents of the community are allowed access into the property.

A standard means for dealing with this level of visitor restriction and entry is in the form of a staff member at a controlled access point of the community. When a visitor presents him or herself for access to visit a particular resident, various levels of staff-enforced checks may be implemented, starting with recording the name of the visitor, the license plate of the vehicle, the name of the resident and, in more complex situations, having contact with the resident either through prior visitor authorization or through direct telephonic communication with the resident at the time the visitor presents him or herself for entry into the community.

More sophisticated means for accomplishing various aspects of dealing with the visitors into a gated or restricted community or business are taught in prior art as follows:

U.S. Pat. No. 5,995,130 to Lee
U.S. Pat. No. 6,504,470 to Puchek, et al.
U.S. Pat. No. 6,513,119 to Wenzel
U.S. Patent Pub. 2003/0112939 to Hom
U.S. Pat. No. 6,749,112 to Terada, et al.
U.S. Patent Pub. 2004/0233036 to Sefton
U.S. Pat. No. 6,794,986 to Puchek, et al.

U.S. Pat. No. 6,513,119 to Wenzel discloses a security access system, the central station of which has access to databases to determine whether the visitor should be granted access. Two U.S. patents to Puchek, et al., U.S. Pat. Nos. 6,504,470 and 6,794,986 teach automated access control methods and apparatus for members and guests, one aspect of the invention details a data collection device proximate an entrance with stored data identifying those persons granted access.

A system to simplify visitor formalities and to manage visitor's entry into and departure from a gate is taught by Terada, et al. in U.S. Pat. No. 6,749,112. U.S. Pat. No. 5,995,139 to Lee discloses a system for identifying visitors utilizing video and audio means, a computer system and monitor.

U.S. published application 2003/0112939 to Hom teaches a security system for use with a security gate entry system with audio means and Sefton discloses an automated site security, monitoring and access control system with an expected visitor database in U.S. published application 2004/0233036.

BRIEF SUMMARY OF THE INVENTION

This invention is directed to an interactive visitor announcement/access control system for residents of limited access and gated communities. The system includes a computer database and a community staff-operated personal computer (p.c.) located at each visitor access point to the community, the staff p.c. being connected to the database by direct link and/or via the Internet. Each resident having a personal computer is provided with limited interactive Internet access to the database to enter scheduling information, edit scheduling information and a description of each expected visitor, including the visit date and time, the name of each visitor, and a printed bar-coded pass authorization and mode of delivery thereof for each visitor.

It is therefore an object of this invention to provide a simplified interactive visitor announcement/access control system for residents of limited access or gated communities which are initiated by each resident of the community.

Yet another object of this invention is to provide an interactive visitor announcement/access control system which reliably insures that only authorized visitors are allowed into the community through one or more of the limited access points into the community.

Still another object of this invention is to provide an interactive visitor announcement/access control system having a central computer database into which residents may input details of each visitor and which is immediately accessible to staff members of the community manning each of the visitor access points into the community through the use of personal computers and Internet access into the database.

And a still further object of this invention is to provide an interactive visitor announcement/access control system which provides for multiple modes of dealing with printed bar-coded pass authorization in conjunction with each visitor authorized by one of the residents of the community, and/or the community's administration (if applicable).

In accordance with these and other objects which will become apparent hereinafter, the instant invention will now be described with reference to the accompanying drawings.

BRIEF DESCRIPTION OF THE SEVERAL VIEWS OF THE DRAWING(S)

DETAILED DESCRIPTION OF THE INVENTION

Figure 1:
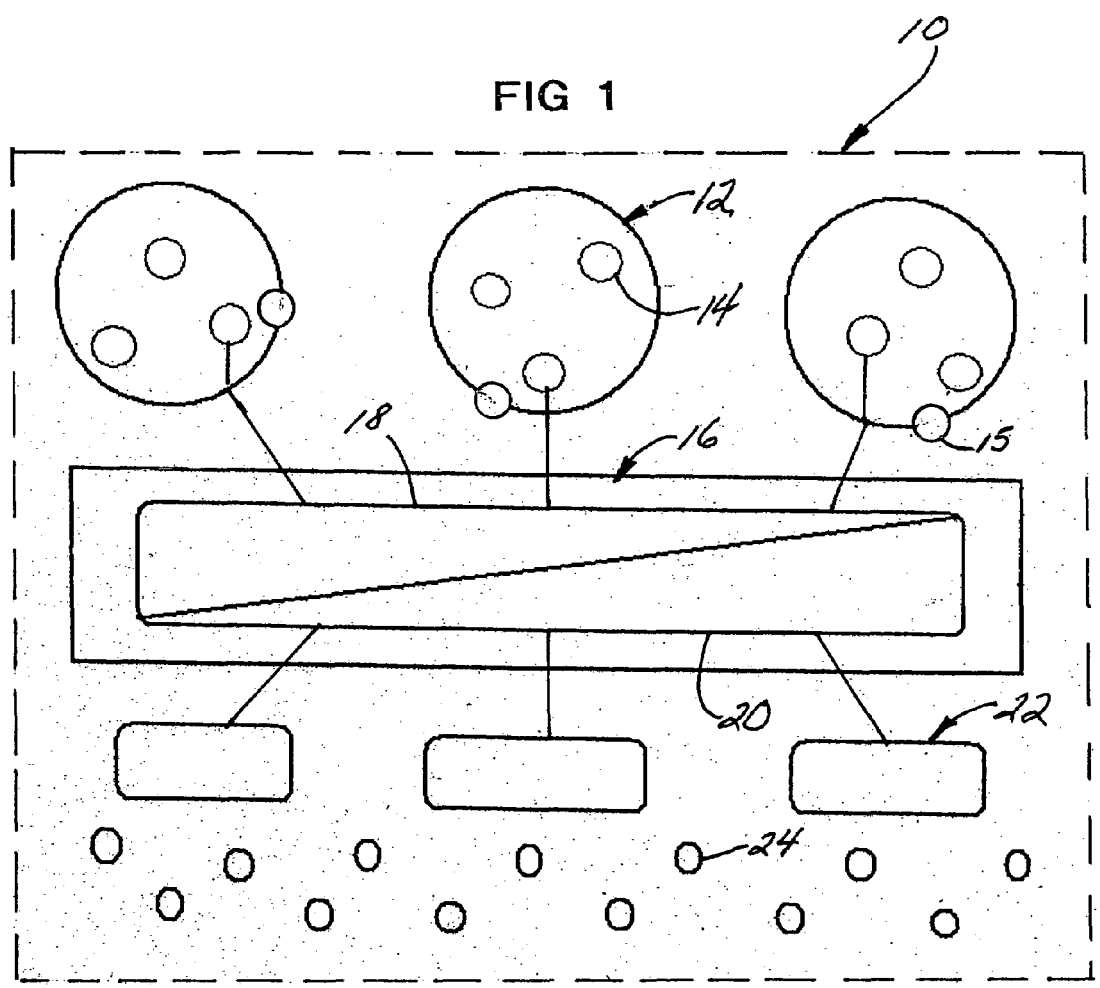
FIG. 1 is a simplified block diagram of the system.

Referring now to the drawings, the system is generally shown at numeral 10 in FIG. 1 and includes one or more communities shown at numeral 12 each of which include a plurality of residents shown at 14. Each of these communities 12 is in the form of a gated or limited access community wherein visitors into the property are required to pass through one or more available visitor access points shown typically at numeral 15. Each of the residents 14 having a computer and the ability to gain access to the Internet shown generally at numeral 16 is provided with access codes to facilitate Internet access into the central computerized database shown at 18 with respect to each resident. At 20, the staff member has database access via a personal computer (p.c.) at each staff-manned station 22, also located at each of the visitor access points 15. Visitors are shown typically at numeral 24 as they approach each of the community staff-operated stations at 22, which again, is located at one of the visitor access points 15.

Figure 2:
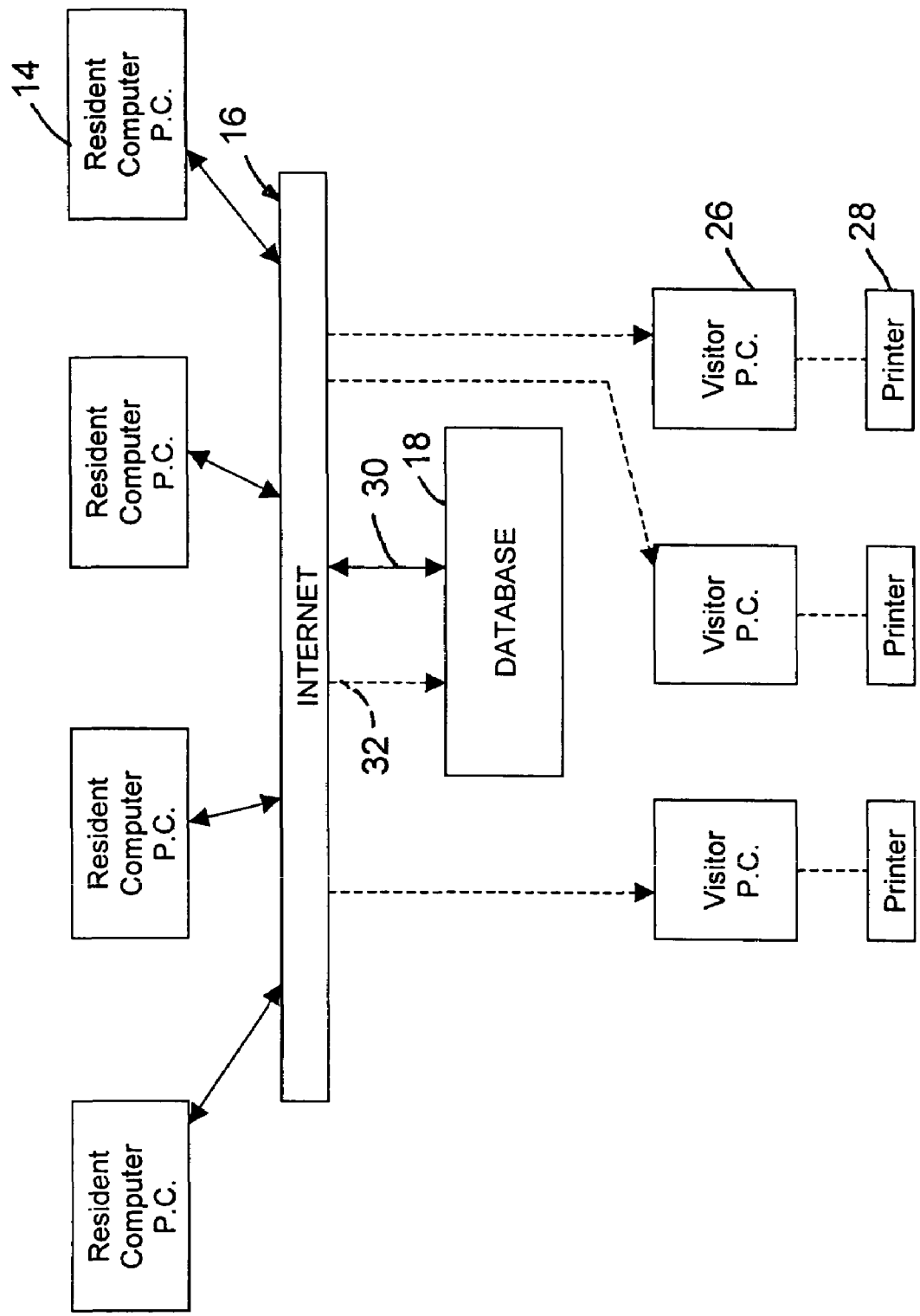
FIG. 2 is a block diagram showing the interaction between each resident, the central computer database and each authorized visitor of a resident, communication therebetween being supported by the Internet.

As seen in FIG. 2, each of the residents 14 having interactive access via the Internet 16 into the central database 18 as operated by a system manager (not shown) is provided. Additionally, for the purposes detailed herebelow, each visitor 24, after having been authorized by a resident 14 by entering details of the visitors visit into the database 18 may receive an email directly from the database 18 via the Internet 16 to download (if applicable) and print a bar-coded printed pass using the associated printer 28.

Communication between each of the residents 14 via the Internet 16 into the database 18 is shown in solid line to be interactive, i.e. data and information may flow in both directions between each of the personal computers (pc) of each resident 14 and the database 18. Where access is limited into the database 18 via the Internet 16 on a one-way basis, that access is depicted in dashed or hidden lines as with respect to the information being accessible for download only by each of the visitors 26.

Figure 3:
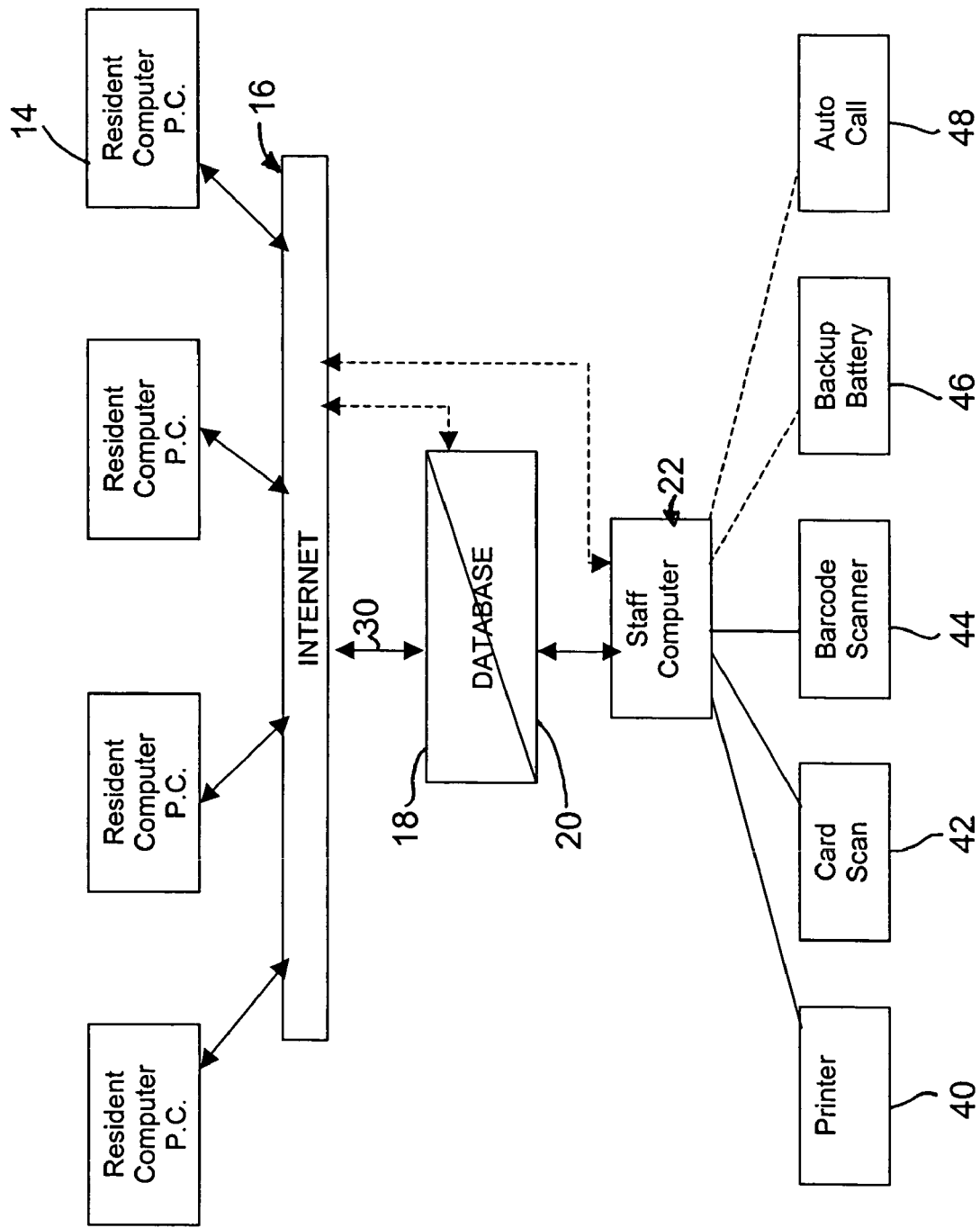
FIG. 3 is a block diagram showing the system showing additional equipment supporting the staff member located at a point of entry into the community.

In FIG. 3, the staff computer is shown at 22 to have access into the database 18 via the Internet 16 either by hard wire or direct access shown in solid line or in bi-directional information flow fashion in hidden line. Each staff-manned computer station having a pc computer at 22 as previously described, is supported by one or more of the additional pieces of equipment such as a printer 40, a card scanner at 42, a bar code scanner at 44, a back-up battery at 46 and an auto call function at 48. These functions will be described in detail herebelow.

Residents' P.C. Activity

After proper login procedures into the database 18 via the Internet 16, a resident 14 will be presented with a computer screen on his or her p.c. which displays a four-month visitor inventory calendar. From the home inventory computer screen, each resident may then choose to announce a visitor or visitors and to schedule the visit, select the number of visitors scheduled to visit at the same time select the access dates from a four-month calendar and designate the time of the visit(s). The resident will then input the last name of each of the visitors, the first name and the e-mail address of each visitor. The resident may also include a map for each of the visitors to show the resident's location which may also be printed on a "DashPass" or printed bar-coded pass authorization described more fully herebelow. The resident may also select the visitor arrival notification method described herebelow, the DashPass or printed bar-coded pass authorization delivery method described herebelow. After all of this data has been properly entered into the database 18, the resident 14 will then end the data input communication for that session.

Additional functions are provided to the resident 14 via their p.c. through the Internet such as the "edit visitor information page" wherein details of a visit in all aspects may be altered, redetermination of the mode of delivery of the DashPass or printed bar-coded pass authorization may be made, and so forth. Additional special functions of the system may also be activated by the resident such as that of a "24/7" visitor authorization, the scheduling of an "open house" or a "garage sale", each of which is described more fully herebelow.

Staff P.C. Activity

At each community access point 15 as manned by a community staff member, an opening screen of their p.c. is provided from the database 18 indicating the details of the present day's activities, including a register of visitors expected for initial arrival within a selected time period of the day. Visitors names, resident names, resident phone numbers, resident addresses DashPass or printed bar-coded pass authorization delivery method and the initial visitor time of arrival are typically displayed.

Additionally, the staff member may conduct a search of the database 18 in the form of an active access search of all scheduled visitors for the current day and whether they have been checked in and to what extent they are permitted access into the community. A future access search may also be conducted showing all scheduled visitors for the next day and forward therefrom for the entire community. Those visitors which have been provided with "24/7" access may also be searched along with a visitor history showing the previous access provided to each visitor or all visitors collectively. Further, a search may be conducted of the visitors scheduled for a specific date in the past or future. A search may be conducted of the visitor's last name for all previous and presently scheduled visits on the current date, in the past and in the future. A search may be conducted of the Resident's last name for all visitors previously and presently scheduled visits on the current date, in the past and in the future. A license number search may be performed to locate a specific vehicle which may have been previously inputted into the database 18 as previously described.

A staff member may announce/edit/cancel a visitor or visitors for a resident by selecting "Announce Guest(s)" button on the staff main screen. The staff member inputs the last name and first name of the resident to search the database 18 for a match. Once the resident name is confirmed, the staff member accesses the resident's home page to proceed with the announcement, editing or cancellation on behalf of the resident.

Check-In Procedure

In order for a visitor to be able to check in and receive access into the community to visit a specific resident, the visitor must be registered in the database 18 by the resident or gatehouse staff member. The bar-coded printed DashPass expedites the check-in procedure. There are two modes of delivering the DashPass to each visitor provided by the system. The first method of DashPass delivery is at a visitor access point 15 wherein a staff member identifies the scheduled visitor previously entered into the database 18 and viewable on the p.c. of the staff member. The p.c. screen will display the visitor information on the visitor information page of each resident whereupon the staff member will check and scan driver's license and enter the license plate number into the database 18. The arrival time is recorded after which a DashPass/Barcode number is automatically assigned to the visitor for that particular visit and a physical DashPass with barcode is automatically printed at 40 in FIG. 3 which is then provided to the visitor. At this point, the visitor is allowed access into the community while the staff member activates an automatic pre-recorded telephone or Internet phone notification to the resident as previously selected by the resident for mode of notification.

The alternate means for dealing with the DashPass and barcode is via the Internet and delivery by e-mail. This process has to be authorized by the resident which, as previously described in FIG. 2, then the bar-coded DashPass is e-mailed to the visitor directly from the database 18 to download and print the DashPass with barcode at 28. Utilizing this method, the visitor simply presents the printed pass to the staff member upon entry into the community. The staff member then scans the barcode for authenticity at 44, scans the driver's license of the visitor at 42, records the license plate number into the database 18 and then allows the visitor to gain access into the community. Again, a pre-recorded telephone or Internet notification to the resident is then executed by the staff member.

DashPass/Barcode

The DashPass or printed pass with barcode provides visitor recognition and may be delivered via email or directly at the Community Gatehouse. Each community will have the option to include this service when implementing the present invention. The community administrations will be able to activate/deactivate the availability of this service to an entire community but is not offered to individual residents.

Each resident may be provided the ability to include a DashPass for their arriving Visitors by simply highlighting a box on the appropriate screen next to the words "Email DashPass" next to each visitor during the announcing/editing of the visitors. Each community has the ability to allow residents to issue, cancel and reissue a DashPass and to issue/cancel & reissue DashPass at the gatehouse.

If a DashPass is lost or damaged, a new DashPass can be easily emailed by the resident or printed by the gatehouse, automatically canceling the previous pass, and transferring all information from the canceled DashPass to the reissued DashPass. If a Resident edits the last access date, this triggers the gatehouse to reissue the DashPass when the visitor's pass is scanned. The DashPass barcode may not need to be changed in this instant, only if the community prints the expiration date on the pass.

The "issue/reissue/cancel" functions are always possible on the Staff Screen. Some communities may permit their residents to "issue/reissue/cancel" a DashPass, but the gate ALWAYS has this ability.

On the initial scan of a DashPass, displayed on the staff screen is "FIRST VISIT—CHECK ID" or "FIRST VISIT—SCAN ID", depending on the community's requirements, along with "INPUT LICENSE NUMBER".

There is an individual visitor journal/history of the time, date and staff member, each occasion the visitor's DashPass is scanned. There is a secondary history for the barcode being scanned at a community with one or more sub-gatehouse entry points (communities within a gated entrance "within" the gated community).

When a valid DashPass Barcode is scanned, all visitor data on file will briefly (5 seconds) appear on the Staff Screen {Visitor Name, Resident Name, Resident Address, Resident Phone Number, 4 Month Calendar, Card Scan Photo (if applicable), License Plate Number (if applicable), I.D. Photo (if applicable), Date(s), Time(s) and Staff Member(s) Scanned (history), along with "ACCESS PERMITTED" displayed in large, green letters}

When an (EXPIRED) DashPass Barcode is scanned; the Resident's Name, Telephone numbers, Visitor's Name and Expiration Date are displayed on the screen along with "EXPIRED DASHPASS" displayed in large, red letters.

When a (PREMATURE) DashPass Barcode is scanned, the Visitor's Name, Resident's Name and Resident's Telephone numbers are displayed on the screen along with the 4-month calendar with valid access dates highlighted.

Instead of emailing "detailed directions" from the Visitor's home to the resident's home with the DashPass, the Visitor may receive a map displaying a star pinpointing the resident's house (radius of approx 10 miles).

Map Query (Via Gatehouse)

A staff member has the option of printing a detailed map from the gatehouse to the resident's house. This option is available on the "check-in page" as well as on the "visitor's details page".

Card Scan

The Data Field is directly on the Visitor's data page (after "Search Results) to accommodate a scan made of a driver's permit or business card. Visitor History searches from communities which utilize the Card Scan includes the picture (or a link to the picture) within the history.

Open House Feature

Gatehouse staff and the residents establish a date or dates to conduct an Open House. Each community will have the option to permit residents and gatehouse staff to announce an open house or only to permit the gatehouse staff to do so. The database includes date(s), time frame, resident name, resident address, resident contact phone number. When a staff member clicks on the resident's address it allows the staff member to add a visiting Visitor to the file and to scan a business card or driver's permit or type in visitor's name. When the staff member clicks "submit"; the time, date and staff member are automatically included and stored into this file.

When a Staff Member wants to see all open houses on a particular date, they click on "Open House", which takes them to a screen similar to the Resident's Home Page. They scroll over a date and the drop down box displays the residents having an open house on that date. This function can be linked with the "Garage Sale" feature. When staff member selects a resident on a date that has past, all visitors who arrived for that address are displayed.

Staff member has the option to select a date and display "ALL" Visitors who arrived on that date for "ALL" Open Houses within the community or select a resident's name and display visitors who arrived to visit at a particular resident's open house. When they select a resident from a future date, it allows them to edit or cancel the entry. Next to the resident's address, is a "PrintMap" button to print driving directions from the gatehouse to the open house. Resident's name, warnings, speed limits, etc. may also be printed.

Garage Sale Feature

Residents and/or Gatehouse staff and the residents can establish a date or dates to conduct a Garage Sale. Each community has the option to permit residents and gatehouse staff to announce a garage sale or only to permit the gatehouse to do so. The database will include date(s), time frame, resident name, resident address, and resident contact phone number.

When a staff member clicks on the resident's address it allows the staff member to add a visiting Visitor to the file and to scan a business card (if applicable) or driver's permit (if applicable), or type in visitor's name. When the staff member clicks "submit"; the time, date and staff member I.D. number are automatically included and stored into this file in the database. When a staff member wants to see all garage sales on a particular date, the click "Garage Sale", which takes them to a screen similar to the Resident's Home Page. They scroll over a date and the drop down box displays the residents having a garage scale on that date. This function can be linked with the "Open House". feature. When a staff member selects a resident on a date that has past, all Visitors who arrived for that address are displayed. Staff members have the option to select a date and display "ALL" Visitors who arrived on that date for "ALL" Garage Sales within the community.

When staff selects a resident from a future date, it allows them to edit or cancel the entry. Next to the resident's address is a "PrintMap" button to print directions from the gatehouse to the Garage Sale. Resident's name, warnings, speed limits, etc. may also be included.

Address Book Feature

Each Resident has a personal address book for Visitors. Every Visitor the resident inputs has a box to check to include the Visitor (First & Last Name and Email Address) in their personal Address Book. If the Visitor's last name and first name are duplicated, it takes the resident to a page to edit the Visitor along with a notice that the Visitor is already in the address book. The resident has the ability to access their address book.

License Plate Feature

When a Staff Member "initially checks-in" a Visitor, the next page has a field to input the license plate number of the vehicle. Next to the field is a drop down box to select the state. Once the State is selected, the page reverts to the Staff Home Page. The inputted license plate number is networked to the Staff Home page to enable a search.

Dual/Secondary Community

The DASHPASS barcode accommodates a secondary gated community database within a master gated community. The secondary community gate is usually unmanned. A fixed, barcode scanner positioned at the secondary community gate will read the same barcode which the Visitors use to access the master community gate. A separate history file is created for the secondary community.

Power Failure Back-Up

When the Gate House experiences a "power failure", the staff member on duty has the ability to print a list of all visitors (alphabetically) with active access from 12:00 am on the day of the power outage, through 11:59 pm and print a list of all visitors (alphabetically) with active access from 12:00 am on the day of the power outage through 11:59 pm (or 6:00 am the following day if power outage occurs after 9:00 pm.

Staff Member not Signed-In

When a Resident attempts to announce a Visitor within 15 minutes from the current time and there is no Staff member signed-in and the resident presses the SUBMIT button, the next screen displays "WE ARE EXPERIENCING A BRIEF TRANSMISSION DELAY, PLEASE CALL THE GATE HOUSE TO ANNOUNCE YOUR VISITORS" Note: This transmission delay is temporary and only affects the visitors listed below.

Telephony/Dialogic Feature

When the resident announces or edits date for a visitor, they have the option to select to:
  a) Receive a prerecorded telephone arrival announcement from the gatehouse on the Visitor's initial visit into the community;
  b) Receive a prerecorded telephone arrival announcement from the gatehouse each time the Visitor passes through the gate. (Only available with DashPass barcode entry); or
  c) No arrival announcement at Visitor entry(s).

Residents' Password Reminder

There is a backup function which allows residents to request their USER NAME and PASSWORD emailed to them in case they are forgotten. Link is located directly on the Resident's Sign-in page.

History Storage/Data Retrieval

This system can save all information to CD-R with the system Administration for the past tune of history since the last download.

Community Administration Page

A data field for each community to Add/Delete and Edit Residents, Add/Delete and Edit Staff Members, input community information data on DashPass and input neighborhood information data on second DashPass page.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

The invention claimed is:

1. An interactive visitor announcement/access control system for residents of limited access and gated communities, consisting of:
  a computer database accessible via the Internet;
  each resident having a personal computer (p.c.) and Internet access is provided with limited access to said database to enter into said database visitor scheduling information and a description of each visitor including the visit date and time, the name of each visitor, printed pass authorization and mode of delivery thereof for each visitor;
  a community staff-operated personal computer (p.c.) located at each visitor access point to a community and connected to said database by direct link or via the Internet;
  each said staff-operated p.c. monitoring upcoming visitor scheduling information and visitor descriptions entered into said database by each resident;
  a staff member using said staff-operated p.c. to check in each visitor at time of arrival by comparing the visitor's actual identification information to that previously entered into said database and, thereafter, authenticating or issuing a bar-coded printed pass to the visitor before admitting the visitor, the staff member also notifying the resident of the visitor's arrival.

2. An interactive visitor announcement/access control system as set forth in claim 1, wherein:

each visitor having a personal computer (p.c.) and access to the Internet being provided limited access to said database to print said printed pass prior to visiting the resident that authorized issuance of said printed pass.

3. An interactive visitor announcement/access control system as set forth in claim 1 wherein each resident may also enter into said database further visitor information, including:

a mode of visitor arrival notice, if any;

a method of authorizing the printed pass, whether by the staff or by visitor p.c. access to said database;

a revision of visitor scheduling;

an authorization for unlimited visitor access into the community; and a scheduling of an open house or a garage sale wherein all visitors of the resident are provided unrestricted access to the resident's location during a particular time period.

4. An interactive visitor announcement/access control system as set forth in claim 1, wherein:

each staff member at each staff-operated p.c. may also schedule into said database a previous visitor of a resident for another resident visit upon telephone request of the visitor.

5. An interactive visitor announcement/access control system as set forth in claim 1, wherein:

each said staff-operated p.c. is supported at the visitor access point by a printer, a bar code reader for printed pass authentication, a drivers license scanner, and resident communication access for announcing the arrival of each visitor schedule, all information of which is entered into said database.

6. An interactive visitor announcement/access control method for residents of limited access gated communities, consisting of:

providing a computer database accessible via the Internet;

providing limited access to said database to each resident having a personal computer (p.c.) and Internet access to enter into said database visitor scheduling information and a description of each visitor including the visit date and time, the name of each visitor, printed pass authorization and mode of delivery thereof for each visitor;

providing a community staff-operated personal computer (p.c.) at each visitor access point to a community and connecting each said staff-operated p.c. to said database by direct link or via the Internet;

using said staff-operated p.c., monitoring upcoming visitor scheduling information and visitor descriptions entered into said database by each resident;

using said staff-operated p.c., checking in each visitor at time of arrival by comparing the visitors actual identification information to that previously entered into said database;

authenticating or issuing a bar-coded printed pass to the visitor before admitting the visitor;

notifying the resident by the staff member of the visitors arrival;

providing each visitor having a personal computer (p.c.) and access to the Internet with limited access to said database to print said printed pass prior to visiting the resident that authorized issuance of said printed pass;

allowing each resident to enter into said database further visitor information including a mode of visitor arrival notice, if any, a method of authorizing the printed pass, whether by the staff or by visitor p.c. access to said database, a revision of visitor scheduling, an authorization for unlimited visitor access into the community, and a scheduling of an open house or a garage sale wherein all visitors of the resident are provided unrestricted access to the resident's location during a particular time period;

allowing each staff member at each staff-operated p.c. to schedule into said database a previous visitor of a resident for another resident visit upon telephone request of the visitor;

supporting each said staff-operated p.c. at the visitor access point by providing a printer, a bar code reader for printed pass authentication, a driver's license scanner, and resident communication access for announcing the arrival of each visitor schedule, all information of which is entered into said database by staff.

7. An interactive visitor announcement/access control system for residents of limited access and gated communities, consisting of:

a computer database accessible via the Internet;

each resident having a personal computer (p.c.) and Internet access is provided with limited access to said database to enter into said database visitor scheduling information and a description of each visitor including the visit date and time, the name of each visitor, printed pass authorization and mode of delivery thereof for each visitor;

a community staff-operated personal computer (p.c.) located at each visitor access point to a community and connected to said database by direct link or via the Internet;

each said staff-operated p.c. monitoring upcoming visitor scheduling information and visitor descriptions entered into said database by each resident;

a staff member using said staff-operated p.c. to check in each visitor at time of arrival by comparing the visitors actual identification information to that previously entered into said database and, thereafter, authenticating or issuing a bar-coded printed pass to the visitor before admitting the visitor, the staff member also notifying the resident of the visitor's arrival;

each visitor having a personal computer (p.c.) and access to the Internet being provided limited access to said database to print said printed pass prior to visiting the resident that authorized issuance of said printed pass;

said database programmed to receive from each resident further visitor information including:

a mode of visitor arrival notice, if any;

a method of authorizing the printed pass, whether by the staff or by visitor p.c. access to said database;

a revision of visitor scheduling;

an authorization for unlimited visitor access into the community; and a scheduling of an open house or a garage sale wherein all visitors of the resident are provided unrestricted access to the resident's location during a particular time period;

each staff-operated p.c. configured for scheduling into said database a previous visitor of a resident for another resident visit upon telephone request of the visitor.

* * * * *